Patented June 29, 1943

2,322,930

UNITED STATES PATENT OFFICE 2,322,930

FILLER COMPOSITION

Harry F. Gardner, Snyder, N. Y., assignor to Certain-Teed Products Corporation, New York, N. Y., a corporation of Maryland No Drawing. Application March 23, 1940, Serial No. 325,552

4 Claims. (Cl. 106—114)

This invention relates to wall constructions, especially those which utilize panels or wall boards carried upon a supporting structure. The invention particularly relates to fillers for the joints between such panels or wallboards.

In constructions of the type referred to, especially those in which the panels or wall boards are erected on studs or ceiling joists, one of the problems which arises is that of making the joints between the panels or wall boards inconspicuous. Particularly in walls which are not to receive a finish, except in some cases one or two coats of paint, it is desirable that the space of greater or less width which necessarily exists between the adjacent edges of two boards erected in the wall shall be filled with a suitable material which will not only fill and cover the joint but which will have qualities which will maintain the concealment of the joint, even when settlement, shrinkage and movement under load or various distorting forces occur.

Heretofore cements, some of which were made with glues such as casein or with other adhesives, have been used with or without reinforcing membranes or tapes laid over the joint between the two boards, the membrane or tape being covered by the cement which has been "feathered" out to merge with or be tangent to the surfaces of the adjacent boards or panels. Fillers containing calcined gypsum with hardening ingredients also have been used. In some cases, recesses or depressions have been provided along the meeting edges of the panels to provide space for the cement or the joint concealing material as well as for the tape and its covering coating of cement.

A fault which has been found with joint fillers and joint cements of the type which have been used heretofore is that under the strains produced by loads and other stress brought upon the wall due to settlement, expansion, contraction under heat and other forces cracks have developed in the joint material itself. Another fault experienced with ordinary joint fillers and cements is that they have required too much water to put them into the necessary plastic or flowable condition for applying with a putty knife or other such instrument, that they have had too great shrinkage upon drying so that cracks have developed in the surface of the applied filler or cement. Moreover, many of them have had the objection that they have dried out before the cement or other setting material contained therein had set and, therefore, a properly set hard body of the cement with a resultant hard surface which would not dust off was not obtained.

The invention proposes a combination of materials which it has been found can be combined without detriment one to the other while practicably securing all of the necessary properties to avoid the difficulties which have been referred to. The following formulae is indicative of the types of materials which are used:

|  | Pounds | Per cent |
|---|---|---|
| Amidex | 2.5 | 2.5 |
| Plastic clay | 10.0 | 10 |
| Fibrous talc | 10.0 | 10 |
| Calcined gypsum | 77.5 | 77.5 |
| Satin french ochre | .10 | |
| Medium chrome yellow | .05 | |
| Retarder | .03 | |
|  | 100.18 | 100.0 |

The cement or filler of the above composition has a testing consistency of about 56 to 59 and will set in about 60 to 90 minutes. The amount of water suitable for mixing with the filler of the above composition to obtain a desirable working consistency for filling the joints may be about 5 lbs. of water to 10 lbs. of the filler. It has been possible with the compositions of the invention to obtain a filler in which the water-carrying capacity is relatively low and is within the ordinary range of testing consistency for calcined gypsums in common use, that is, from 40 to 75. Preferably, however, the range of testing consistency would be between 55 and 60 with a corresponding practical amount of water to be used to secure a working consistency of about 3 lbs. to 5 lbs. of water for each 10 lbs. of the filler.

Joints made with this filler show only limited portions which dry out before setting but these portions are sufficiently hard and even so that a satisfactory hard joint without dry-out cracks or tendency to dust is obtained. Moreover, the qualities of the cement are such that it works readily under the putty knife and is easy to mix and apply so that joints filled therewith may be rapidly finished. Because of the elasticity of the filler a permanent joint covering is secured which will not crack under the strains to which the wallboard structure is subjected.

The above formula is merely an example of the classes of materials which are suitable for the purposes of the invention. The name "Amidex" is a trade name given to a material which, similarly to starch gums and to natural gums, such as gum arabic, has the property of hardening and of inducing hardness in a mass of calcined gypsum when set from a plastic or pourable condition. Amidex is a complex carbohydrate derivative characterized as a hydrolized corn starch. It is believed to contain, among other ingredients, dextrine as well as dextrose and starch. It may be classified as a saccharide or, in a more limited sense, a starch derivative or a modified starch. Dextrine, also, is a starch derivative or a modified starch and the properties of these two materials are similar in that they both are capable of inducing hardness in the set mass of calcined gypsum. The class of materials suitable for this purpose in the invention may be broadly defined as saccharides, more specifically as starch derivatives, in a still more limited sense as starch gums, and to include also the natural gums such as gum arabic which are saccharides.

In the preferred embodiment of the invention Amidex is used, particularly where a white, unstained filler is desired. In some cases, this white filler is requisite because of the character of the finish to be applied to the wall and over the joint, such as the application of light tints of water or oil paints. Moreover, Amidex is cheaper and less viscous than gum arabic. In some cases, however, where a high degree of hardness is desired, gum arabic may be preferred. Dextrine, although it is not so effective as Amidex for hardening the cement or filler and leaves the filler colored by virtue of the color of the dextrine as commercially available, nevertheless may be used in some cases because it is cheaper. The formula, therefore, represents a preferred embodiment of the invention as to the material which is added for the purpose of securing the hardness.

My investigations have shown that, for the purpose of producing the requisite hardness in the filler when it sets from a plastic condition obtained by mixing with water and without detriment to other qualities produced by other ingredients of the composition, the saccharide or starch derivative or the natural gum, should be held within the limits of 1 to 20% in the composition of the three typical ingredients in the dry state, namely, the saccharide, the plastic clay, and the calcined gypsum. Preferably, however, the range preferred for the saccharide is between 1% and 10%, particularly for the preferred saccharides above mentioned. Too much of the saccharide may cause shrinkage upon setting and hardening to an extent which will produce objectionable cracks.

By plastic clay is meant a clay of such plasticity, that it has the capacity when mixed with water to the consistency of mortar, non-pourable, to retain its water when placed against a porous base tending to absorb water from the clay, so that the plastic mass can be troweled for an appreciable time without becoming so dry that it rolls up under the trowel or putty knife. The measure of the plasticity is this time measured from the moment of placing the mortar on the absorbent base in the form of blotting paper and immediately starting the trowelling. Clays from various sources may be used and are suitable for the purposes of the invention if they have a plasticity of at least two minutes as determined by said method.

The amount of the plastic clay suitable to cooperate with and not interfere with the function of the other ingredients should be held substantially between 2% and 20% but preferably, especially when used with gum arabic, substantially between 5% and 15%.

The clay serves the purpose of improving the plasticity of the composition so that the workman in applying the material to the joint finds it to be "easy working," that is, so that it may be spread readily lengthwise along the joint and controlled under the action of the putty knife or trowel to confine the applied filler to the desired width or space at either side of the joint and to move the plastic material under the putty knife or trowel to "feather" or even it out to a thin edge and with the surface substantially tangent to the faces of the panels or the wallboards. It is important that this may be done without separation of the mass of the filler, thus producing cracks, and without rolling up of the filler under the knife or trowel, or massing, bunching or balling thereof rather than laying in a continuous smooth surface mass along the joint. Although larger amounts of clay might improve the plastic quality of the filler, too large a proportion would weaken the filler when in set condition in the joint. In some cases the saccharide, e. g., the Amidex, also assists in developing plasticity. It is important, however, to avoid too large an amount of this ingredient because, although the hardness is increased, the filler in set condition tends to develop cracks.

The calcined gypsum utilized for the purposes of the invention may be any commercial calcined gypsum of medium to fine grind. In general, the compositions contain a predominant amount of the hydraulic setting material, preferably not substantially less than 80%. A fineness of from 75% to 99% through 100 mesh is indicative of the degree of particle reduction suitable for the purpose of the invention. A fineness which is indicated by at least 90% through 100 mesh is preferable, so that the edge of the filler when placed in the joint may be "feathered" under the trowel or putty knife to a thinness which substantially brings the filler tangent to the faces of the wallboards and avoids any shoulder or ridge equivalent to the particle diameter which would be conspicuous in the finished wall.

For further improvement of the composition in order to secure greater resistance to cracking of the surface of the filler when set from its plastic condition, and to permit in some cases the use of a larger amount of the saccharide, I have found that a mixture of a fibrous variety of talc known as agalite is helpful and is compatible with the other ingredients for the purpose of the invention. This material which is a hydrated magnesium silicate, is considerably harder than the platy or foliated varieties of talc. Without detriment to the desired plasticity of the filler and its hardness when set the agalite talc, by virtue of its fibrous character, reinforces the set filler and aids resistance to cracking under the distortion or strain produced in the wall by the causes above mentioned. Moreover, it is of such dimensional character as not to prevent the "feather edge" application above referred to.

I have found that a talc of this variety having a screen test such that 100% shall pass a 14 mesh screen, and that not more than 40% nor less than 5% shall be retained on a 100 mesh standard screen, is suitable for the invention. A typical screen test for this variety of talc obtained from a given source of supply is as follows:

| | Per cent |
|---|---|
| On 30 mesh | 0.44 |
| On 50 mesh | 5.33 |
| On 100 mesh | 16.85 |
| On 200 mesh | 33.13 |
| Through 200 mesh | 66.87 |

Within the limits above indicated, however, variations from such a screen test may be made while retaining a substantial part of the fibres of the talc of sufficient length to reinforce the filler when set from the plastic condition. Under the action of the putty knife or trowel the fibres tend to lie parallel to the face of the wallboard. As they are of minute diameter they do not limit the formation of the feather edge.

Indicative, but not limited thereto, of the proportions of the fibrous talc which may be mixed with the composition filler to secure a strong joint it may be stated that between 2% and 30% of this fibrous talc may be used. Substantially less than 2% does not have much effect in increasing the resistance to cracking. Substantially more than 30% would produce a filler of insufficient strength because of the consequent reduction of the proportion of hydraulic-setting material, namely, the calcined gypsum, particularly in consideration of the presence of the plastic clay. Preferably, the amount of the fibrous talc may be maintained between 5% and 15% to secure the proper balance with the other ingredients in their preferred percentages as above given so that each ingredient will perform its own function without substantial interference with or by the others. In some cases I may omit the fibrous talc while still obtaining a composition filler which will have the same hardness when set, limitation of dry outs and cracks and the requisite workability for quick applications. Other mineral fibres such as asbestos may be used but agalite is preferred because it mixes more readily with the other ingredients.

While in the prior art it has been proposed to use some of the ingredients of the composition of the invention, I believe it has not been discovered prior to my invention that a composition may be formed in which the ingredients are compatible for the purposes which the filler of the invention serves. Particularly there have not been discovered the proper relations of the proportions of the ingredients which maintain compatibility and are effective to accomplish these purposes. The invention, therefore, secures in one composition all of the qualities which have been referred to above as desirable for a joint filler.

In order to control to the desired degree the setting time of the filler of the invention, a limited amount of ordinary retarder used in gypsum plasters may be incorporated in the mixture. Also in order that the color of the filler may approximate or match the color of the panels or wallboards to which it is applied, a coloring material such as the Satin French Ochre and the Medium Chrome Yellow of the formula given above may be incorporated without detriment to the necessary cooperation of the several ingredients to produce the results which have been accomplished by the invention.

Having thus described my invention, I now claim:

1. Cement for forming joints between the edges of adjacent wallboards comprising calcined gypsum in an amount not substantially less than 77.5%, a saccharide, a clay having a plasticity of not substantially less than two minutes, and a mineral fibre, the amount of the saccharide being substantially between 1% and 10%, the amount of the plastic clay being substantially between 2% and 15%, the amount of the mineral fibre being substantially between 2% and 15%, said percents being based on the dry weight of said four ingredients.

2. A cement for forming joints between the edges of adjacent wallboards comprising calcined gypsum in amount not substantially less than 77.5%, a starch derivative, a clay having a plasticity not substantially less than two minutes, and fibrous talc, the amount of the starch derivative being substantially between 1% and 10%, the amount of the plastic clay being substantially between 2% and 15%, the amount of the fibrous talc being substantially between 2% and 15%, said percents being based on the weight of said four ingredients in the dry state.

3. A cement for forming joints between the edges of adjacent wallboards comprising calcined gypsum in amount not substantially less than 77.5%, gum arabic, a clay having a plasticity of not substantially less than two minutes, and agalite talc, the amount of the gum arabic being substantially between 1% and 10%, the amount of the plastic clay being substantially between 2% and 15%, the amount of the agalite talc being substantially between 2% and 15%, said percents being based on the weight of said four ingredients in the dry state.

4. A cement for forming joints between the edges of adjacent wallboards comprising calcined gypsum in amount not substantially less than 77.5%, Amidex, a clay having a plasticity not substantially less than two minutes, and agalite talc, the amount of the Amidex being substantially between 1 and 10%, the amount of the plastic clay and the amount of the agalite talc each being substantially between 2 and 15%, said percents being based on the weight of said four ingredients in the dry state.

HARRY F. GARDNER.